United States Patent [19]

Shigemoto et al.

[11] Patent Number: 5,096,646
[45] Date of Patent: Mar. 17, 1992

[54] PROCESS FOR PRODUCING RUBBER TUBE AND RESIN COATING DEVICE USED THEREIN

[75] Inventors: Hiromi Shigemoto; Akio Yamamoto, both of Iwakuni, Japan

[73] Assignee: Mitsui Petrochemical Industries, Ltd., Tokyo, Japan

[21] Appl. No.: 465,156

[22] PCT Filed: Jun. 30, 1989

[86] PCT No.: PCT/JP89/00657
§ 371 Date: Feb. 27, 1990
§ 102(e) Date: Feb. 27, 1990

[87] PCT Pub. No.: WO90/00113
PCT Pub. Date: Jan. 11, 1990

[30] Foreign Application Priority Data
Jul. 1, 1988 [JP] Japan .................. 63-165449

[51] Int. Cl.$^5$ ........................................ B29C 47/86
[52] U.S. Cl. ........................... 264/166; 156/244.12; 156/500; 264/236; 264/317; 264/347; 264/DIG. 44; 425/113; 425/379.1
[58] Field of Search .......... 264/166, 149, 150, 347, 264/317, 236; 425/174.8 R, 113, 378.1, 379.1; 156/244.12, 244.14, 500, 155; 204/DIG. 44

[56] References Cited

U.S. PATENT DOCUMENTS

| | | | |
|---|---|---|---|
| 2,708,771 | 5/1955 | Stoneback | 156/244.12 |
| 3,255,284 | 6/1966 | Meislohn | 264/166 |
| 3,581,343 | 6/1971 | Henrikson et al. | 425/113 |
| 3,690,796 | 9/1972 | Borsvold | 264/347 |
| 3,856,446 | 12/1974 | Schultz | 425/113 |
| 4,702,867 | 10/1987 | Sejimo et al. | 264/347 |
| 4,859,380 | 8/1989 | Ogata | 425/174.8 R |
| 4,882,101 | 11/1989 | Ohkita et al. | 264/347 |
| 4,898,703 | 2/1990 | Wells et al. | 264/347 |

FOREIGN PATENT DOCUMENTS

| | | | |
|---|---|---|---|
| 57-93132 | 6/1982 | Japan | 264/347 |
| 60-242031 | 12/1985 | Japan | 425/113 |
| 62-59022 | 3/1987 | Japan | 264/209.6 |
| 62-54217 | 11/1987 | Japan | 264/209.6 |

*Primary Examiner*—Jeffery Thurlow
*Attorney, Agent, or Firm*—Sherman and Shalloway

[57] ABSTRACT

A process and device for producing a rubber tube having a smooth outside surface in which a molten synthetic resin is heated from the inner circumferential side immediately before it flows from a die along the periphery of a rubber material layer and the rubber mentioned is cooled within the die.

3 Claims, 1 Drawing Sheet

PROCESS FOR PRODUCING RUBBER TUBE AND RESIN COATING DEVICE USED THEREIN

TECHNOLOGICAL FIELD

This invention relates to a process for producing a rubber tube having a smooth outside surface, and to a resin coating apparatus directly used for practising the process.

BACKGROUND TECHNOLOGY

To produce a rubber tube including a reinforcing material and having a smooth outside surface, it is the conventional practice to suppress the foaming of a rubber material on the outside surface of the tube in the vulcanization of the rubber material constituting the rubber tube by using a pressurizable vulcanization device and thereby applying pressure to the peripheral surface of the tube, or by coating the periphery of the tube with a synthetic resin or lead.

In the former method of suppressing the foaming of the rubber material on the outside surface of the tube by using the vulcanization device, the foaming itself of the outside surface of the tube can be limited, but still it is impossible to achieve smoothening of the outside of the tube. Moreover, since it is necessary to seal up the inside of the vulcanization device consecutively, this method is inconveniently unsuitable for mass-production.

In the latter method of coating the periphery of the tube with lead so as to smoothen the outside surface of the tube, it is difficult to keep lead under proper care and storage, and expenditures for facilities and operations increase, and the product is likely to increase in cost.

A method comprising coating the periphery of the tube with a synthetic resin, and then vulcanizing the rubber material constituting the rubber tube was regarded as promising as a method for producing a rubber tube having a smooth outside surface. As shown in Japanese Laid-Open Patent Publication No. 290,011/1986, a technique was developed by which the periphery of a rubber tube is coated with a thermally resistant resin cover having a higher melting point than the vulcanization temperature of the rubber material, and then vulcanizing the rubber material by using, for example, microwaves.

In the conventional method of coating the periphery of a tube with a synthetic resin including the one disclosed in the above patent publication, an extrusion die for a resin is used as a resin coating device 2 as shown in FIG. 3, and a synthetic resin 6 is extruded along the periphery of a rubber material layer coated on the periphery of a mandrel to form a resin coated layer 8 continuously on the periphery of the rubber material layer 4. Since the rubber material layer 4 as coated with the synthetic resin layer is heated and thus vulcanized in the subsequent step, the synthetic resin 6 constituting the resin coated layer 8 must have a higher melting point than the vulcanization temperature of the rubber material. Otherwise, during the vulcanization of the rubber material layer 4, the resin coated layer 8 would also be melted and the peripheral surface of the rubber material layer 4 would be destroyed.

Accordingly, the synthetic resin 6 in the molten state flowing through the resin coating device 2 as the extrusion die has to be heated at a temperature above the vulcanization temperature of the rubber material. In the prior art, a heater 10 is mounted on the outside of the device 2 so as to heat the entire device. Furthermore, the rubber material layer 4 coated on the periphery of the mandrel, before being fed into the device 2, is heated by a preheater 12 so that the periphery of the rubber material layer 4 is covered closely with the resin coated layer 8.

However, in the coventional method and device 2, the device 2 is heated from outside so that the synthetic resin may remain flowable, and the rubber material layer 4 is heated with the preheater 12. Hence, during passage through the device 2, volatile components contained in the rubber material layer 4 are likely to be foamed, and thus, the peripheral surface of the rubbery material layer 4 is likely to be coated with the resin coated layer 8 while it is roughened. Accordingly, even if the surface of the rubber material layer 4 is covered closely with the resin coated layer 8, a rubber tube having a smooth peripheral surface is unlikely to be obtained.

DISCLOSURE OF THE INVENTION

The present invention has been completed in order to obviate these inconveniences of the prior art, and has for its object provision of a process for producing a rubber tube having a smooth peripheral surface efficiently and of a resin coating device directly used for its practice.

To achieve this object, the present invention provides a process for producing a rubber tube which comprises forming a rubber material layer comprising mainly an unvulcanized rubber material on the periphery of a mandrel, forming on the periphery of the rubber material layer a thermally resistant resin coated layer having a higher melting point than the vulcanization temperature of the rubber material constituting the rubber material layer, then heating the rubber material layer to vulcanize the rubber material constituting the rubber material layer, peeling and removing the resin coated layer, and then pulling out the mandrel; wherein in the formation of the resin coated layer on the periphery of the rubber material layer, the synthetic resin in the molten state is heated from the inner circumferential side just before it flows out from a nozzle along the periphery of the rubber material layer.

The resin coating device in accordance with this invention comprises an insertion hole through which to insert a mandrel coated on its periphery with a rubber material layer comprising mainly an unvulcanized rubber material, a resin flow passage through which a thermally resistant synthetic resin having a higher melting point than the vulcanization temperature of the rubber material flows, a nozzle for causing the synthetic resin flowing through the resin flow passage to advance along the periphery of the rubber material layer coated on the periphery of the mandrel which is inserted through the insertion hole, and heating means for heating the synthetic resin in the resin flow passage from the inner circumferential side before it flows out of the nozzle.

According to the process for producing the rubber tube and the resin coating layer directly used in the practice of this process in accordance with this invention, the molten synthetic resin is heated from the inner circumferential side just before it flows from the nozzle.

Accordingly, a resin coated layer can be formed closely on the peripheral surface of the rubber material layer without so much heating the entire device and without preheating the rubber material layer. Moreover, the volatile components in the rubber material layer are not foamed before coating of the synthetic resin, and no roughening of the peripheral surface of the rubber material layer occurs. Therefore, in vulcanizing the rubber material contained in the rubber material layer in the subsequent step, foaming on the peripheral surface of the rubber material layer is suppressed to give a smooth peripheral surface because the peripheral surface of the rubber material layer is closely covered with the resin coated layer.

2, 20. . resin coating device; 4. . .rubber material layer; 6. . .synthetic resin; 8. . .resin coated layer; 22. . .resin flow passage; 24. . .mandrel; 26. . .insertion hole; 30. . .cooling tube; 34. . .heater.

BEST MODE OF PRACTISING THE INVENTION

The present invention will be described in detail on the basis of the embodiments in accordance with one embodiment of the invention.

Figure 1:
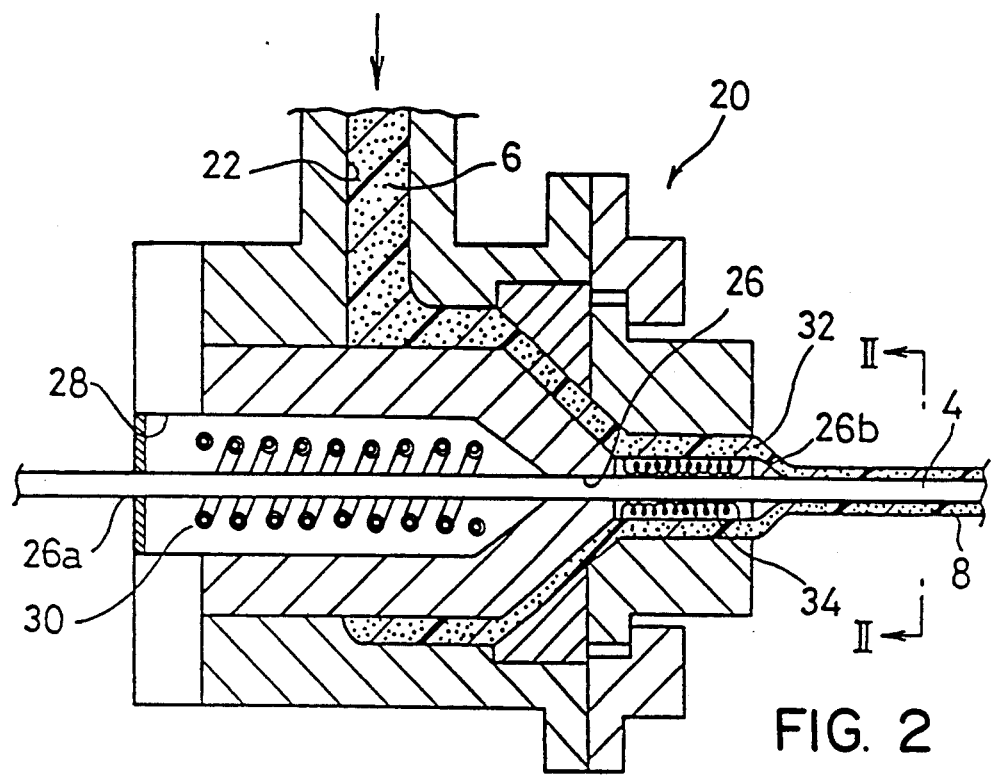
FIG. 1 is a sectional view of the essential parts of a resin coating device in accordance with one embodiment of the invention.
Figure 2:
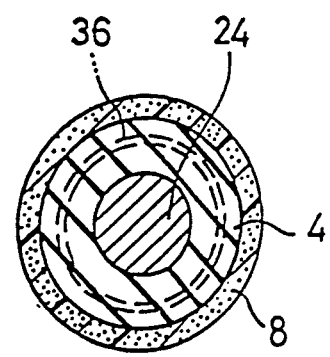
FIG. 2 is a sectional view taken along line II—II of FIG. 1.
Figure 3:
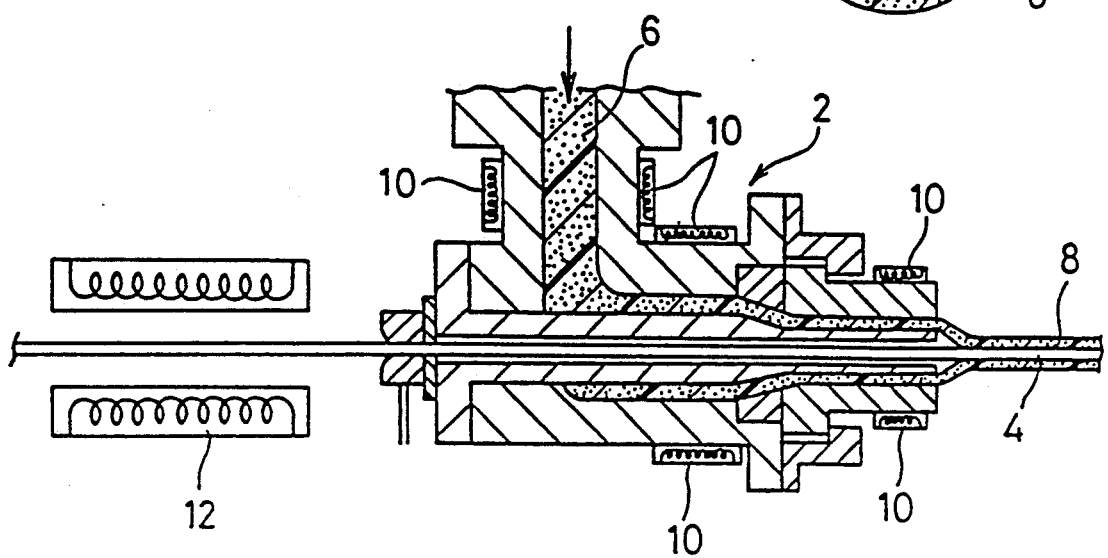
FIG. 3 shows a sectional view of a conventional resin coating device.

FIG. 1 is a sectional view of the essential parts of the resin coating device in accordance with one embodiment of the invention. FIG. 2 is a sectional view along line II—II of FIG. 1.

Before describing the process for producing a rubber tube in accordance with this invention, the resin coating device used directly in the practice of the process will be described.

As shown in FIG. 1, the resin coating device 20 in accordance with one embodiment of the invention is an improved version of a resin extrusion die. The upstream end portion of a resin flow passage 22 through which a molten synthetic resin 6 passes is connected to an extruder. Various known extruders can be used as the extruder for this purpose. Examples are a continuous extruder operable by screw rotation, an injection extruder based on an in-line screw and an extruder based on an accumulator method. The resin coating device 20 includes an insertion hole 26 through which a mandrel 24 coated on its periphery with a rubber material layer 4 containing mainly an unvulcanized rubber material is inserted. A recess 28 is formed on the inlet 26a side of the insertion hole 26. Preferably, a cooling tube 30 is received therein. For example, cooling water is circulated within the cooling tube 30 so as to cool the rubber material layer 4 on the periphery of the mandrel 24. To make temperature adjustment by the cooling tube 30 easy, the inside diameter of the recess 28 is maximized.

A resin flow passage 22 formed within the device 20 communicates with an annular nozzle 32 formed nearly concentrically with the outlet 26b of the insertion hole 2. Hence, the synthetic resin in the molten state is extruded from the nozzle 32 and flows in tubular form and closely covers the periphery of the rubber material layer 4.

Particularly, in the resin coating device 20 in accordance with this invention, a heater 34 as heating means is disposed immediately before the nozzle 32 between the resin flow passage 6 and the insertion hole 26 in order to heat the synthetic resin 6 in the resin flow passage before it flows out from the nozzle 32. The heater 34 may be, for example, an electric resistance heating device or an electromagnetic induction heating device. The heating temperature of the heater 34 can be variously controlled according to the type, for example, of the synthetic resin 6.

The synthetic resin to be extruded from the nozzle 32 may be any thermally resistant resin having a higher melting point than the vulcanization temperature of the rubber material in the rubber material layer 4, and examples are poly(4-methyl-1-pentene), nylon, polyetherimides and polysulfones. From the viewpoint of mold releasability and thermal resistance, poly(4-methyl-1-pentene) is most desirable. When poly(4-methyl-1-pentene) is used as the synthetic resin 6, the heating temperature of the heater 34 is preferably 200° to 350° C.

In the embodiment shown in FIG. 1, no heater for heating exteriorly of the device 20 is shown. As required, such a heater may be provided. Even when a heater is provided exteriorly of the device 20, heating of the entire device 20 as in the prior art is not necessary since the device includes the heater 34 in accordance with this invention.

The process for producing a tube in accordance with this invention will be described on the basis of the embodiment shown in the drawings.

In the process of this invention, the rubber material layer 4 which contains mainly an unvulcanized rubber material is first coated on the periphery of the mandrel 24. As required, a reinforcing material 36 may be included in the rubber material layer 4. Natural or synthetic rubbers may be used as the rubber material constituting the rubber material layer. The reinforcing material 36 may be, for example, metallic wires or synthetic fibers.

Generally, the mandrel 24 is a jig for forming a hollow body, which is adapted to be pulled out in a subsequent step. In the present invention, the outside diameter of the mandrel 24 corresponds to the inside diameter of the rubber tube to be obtained.

Coating of the rubber material layer 4 on the periphery may be carried out by known methods, for example, by extruding the rubber material along the periphery of the mandrel 24.

In the next step of the process of this invention, the mandrel 24 coated with the rubber material layer 4 is inserted through the insertion hole 26 in the resin coating device 20 shown in FIG. 1 from the inlet 26a. When the mandrel 24 has jutted out from the outlet 26b or immediately before it, the synthetic resin 6 is extruded from the nozzle 32 to coat the periphery of the rubber material layer 4 with the resin coated layer 8.

Then, the mandrel 24 coated with the rubber material layer 4 and the resin coated layer 8 is entirely heated to vulcanize the rubber material in the rubber material layer 4. The heating temperature is preferably above the vulcanization temperature of the rubber material and below the melting point of the synthetic resin constituting the resin coated layer 8. This is for the purpose of preventing softening of the resin coated layer 8. Various known means such as microwave heating and heating by a vulcanization vessel may be employed as heating means.

Thereafter, the resin coated layer 8 is peeled and removed and the mandrel 24 is pulled out to give the desired rubber tube. It should be understood that the term "rubber tube", as used in the present specification is used in a broad sense including rubber tubes and rubber hoses.

According to the process of this invention, the molten synthetic resin 6 is heated from the inner circumferential side just before it flows out from the nozzle 32 along the periphery of the rubbery material layer 4. Accordingly, the resin coated layer 8 can be formed closely on the peripheral surface of the rubber material layer 4 without so much heating the entire device 20 and without preheating the rubber material layer 4. Furthermore, before the coating of the synthetic resin, volatile components in the rubbery material layer 4 are not foamed to roughen the peripheral surface of the rubber material layer. Therefore, when the rubber material in the rubber material layer 4 is vulcanized in a subsequent step, foaming on the peripheral surface of the rubber material layer 4 is suppressed to give a smooth peripheral surface because the peripheral surface of the rubber material layer 4 is closely covered with the resin coated layer 8.

The following examples illustrate the present invention. It should be noted that the invention is not limited to these examples.

EXAMPLE 1

Poly(4-mehyl-1-pentene) (to be reffered to as PMP) having an MFR of 26 g/10 min. (tradename, TPX$^R$ MX004, a product of Mitsui Petrochemical Industries, Ltd.) was coated on a nitrile-type rubber tube by using the device shown in FIG. 1. The molding temperature conditions were as follows:
 Cylinder of an extruder: 240°–250° C.
 Prescribed temperature of heater (reference numeral 34): about 280° C.
Compressed air (or water) was passed through cooling tube (reference numeral 30) to cool the raw rubber.

After the resin coating, the coated layer was rapidly cooled in a cooling water tank, and vulcanization was carried out in a vulcanization device (steam autoclave) or a high-frequency vulcanization device. The resin layer was peeled, and the appearance of the rubber hose was examined.

The results are shown in Table 1 below.

The surface foaming and surface luster of the hose were evaluated on the scale of 5 grades as follows:
 Surface foaming
 5: none
 4: almost none, but foaming occurred at one or two sites per 10 m (no problem in practical use).
 3: foaming occurred 2 or 3 sites per 1–2 m.
 2: on a better level than 1, but many foamings occurred.
 1: many foamings occurred.
 Surface luster
 5: very good
 4: good but inferior to 5.
 3: melt fracture began to occur, but the product was usable.
 2: melt fracture occurred slightly vigrously.
 1: melt fracture occurred vigorously.

EXAMPLE 2

PMP used in Example 1 was coated on a styrene-type rubber tube. Otherwise, the molding conditions, etc. were the same as in Example 1. The appearance of the rubber hose was examined.

The results are shown in Table 1 below.

COMPARATIVE EXAMPLE 1

Example 1 was repeated except that no heater was provided, and no cooling of the raw rubber was carried out. The results are shown in Table 1.

TABLE 1

| | Material for the raw rubber | Cooling of the raw rubber | Prescribed temperature (°C.) | Line speed | Appearance (surface condition) of the hose | | Properties of the hose |
|---|---|---|---|---|---|---|---|
| | | | | | Raised and depressed portions | Luster | |
| Example 1 | nitrile-type | yes | 240 | medium | 5 | 2 | ○ |
| | | yes | 260 | medium | 5 | 5 | ○ |
| | | yes | 280 | medium | 4 | 5 | ○ |
| | | yes | 300 | medium | 2 | 5 | Δ |
| Example 2 | styrene-type | yes | 230 | medium | 5 | 3 | ○ |
| | | yes | 240 | medium | 5 | 4 | ○ |
| | | yes | 250 | medium | 4 | 5 | ○ |
| | | yes | 260 | medium | 3 | 5 | ○ |
| | | yes | 270 | medium | 1 | 5 | Δ |
| Comparative Example 1 | styrene-type | no | no | high | 5 | 1 | ○ |
| | | no | no | medium | 3 | 3 | ○ |
| | | no | no | low | 1 | 5 | Δ |

○: No change; Δ: Some decrease of strength

UTILIZABILITY IN INDUSTRY

As described hereinabove, according to the process for producing a rubber tube and the resin coating device used therefor in accordance with this invention, a molten synthetic resin is heated from the inner circumferential side just before it flows out from the nozzle in the formation of a resin coated layer on the periphery of the rubber material layer. Therefore, the resin coated layer can be formed closely on the peripheral surface of the rubber material layer without so much heating the entire device and without preheating the rubber material layer. Moreover, before the coating of the synthetic resin, volatile components in the rubber material layer are not foamed to roughen the peripheral surface of the rubber material layer. Since the resin coated layer is closely coated on the peripheral surface of the rubber material, foaming on the peripheral surface is suppressed at the time of vulcanizing the rubber material in the rubber material layer in a subsequent step, and a rubber tube having a smooth peripheral surface can be produced efficiently.

What is claimed:

1. A process for producing a rubber tube which comprises forming a rubber material layer comprising mainly an unvulcanized rubber material on the periphery of a mandrel, forming on the periphery of the rubber material layer a thermally resistant resin coated layer having a higher melting point than the vulcanization temperature of the rubber material constituting the rubber material layer, then heating the rubber material layer to vulcanize the rubber material constituting the rubber material, peeling and removing the resin coated layer, and then pulling out the mandrel; wherein in the formation of the resin coated layer on the periphery of the rubber material layer, the synthetic resin in the molten state is heated from the inner circumferential side just before it flows out from a nozzle of a die along the periphery of the rubber material layer and the rubber material layer is cooled within the die.

2. The process for producing a rubber tube set forth in claim 1 in which the synthetic resin constituting the resin coated layer is poly(4-methyl-1-pentene).

3. A resin coating device comprising
an insertion hole through which to insert a mandrel coated on its periphery with a rubber material layer comprising mainly an unvulcanized rubber material,
a resin flow passage through which a thermally resistant synthetic resin having a higher melting point than the vulcanization temperature of the rubber material flows,
a nozzle for causing the synthetic resin flowing through the resin flow passage to advance along the periphery of the rubber material layer coated on the periphery of the mandrel which is inserted through the insertion hole,
heating means for heating the synthetic resin in the resin flow passage from the inner circumferential side before it flows out of the nozzle, and
cooling means for cooling the rubber material layer before the synthetic resin is coated on its periphery within the die.

* * * * *